C. ARANDALL & W. C. RUNYAN.
Fly-Trap.
No. 163,719.
Patented May 25, 1875.
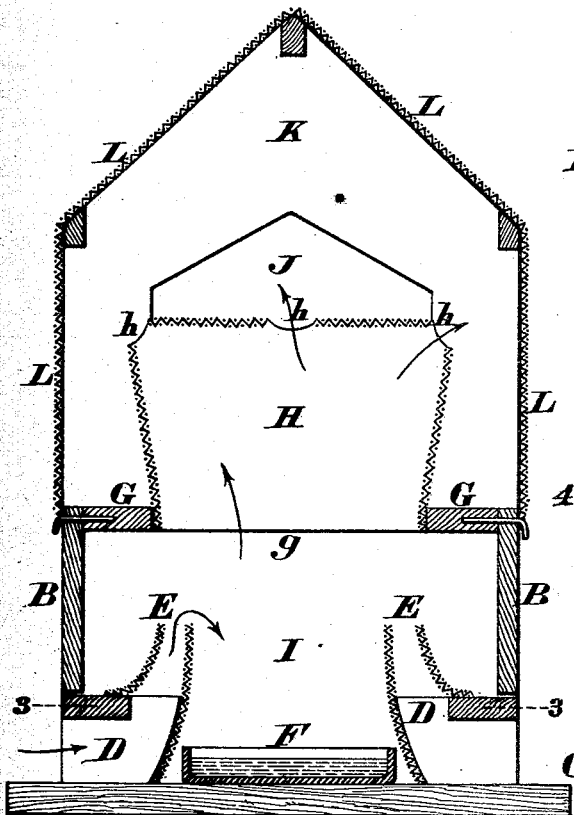
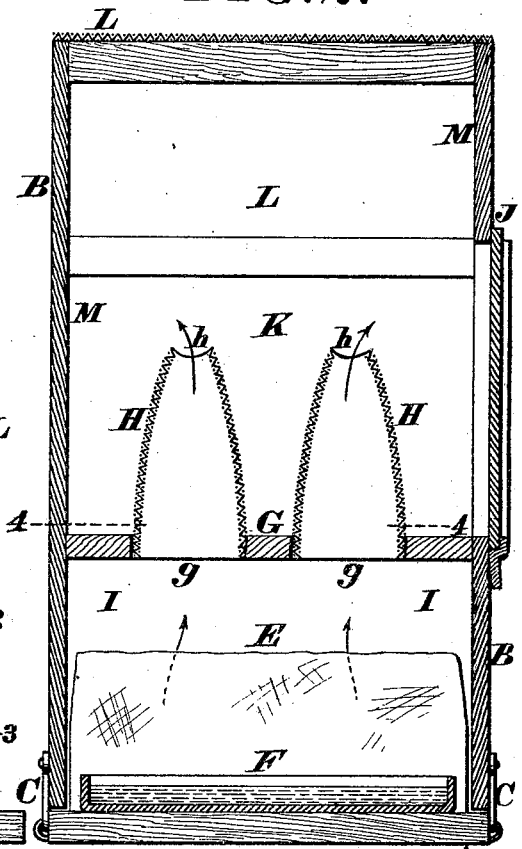
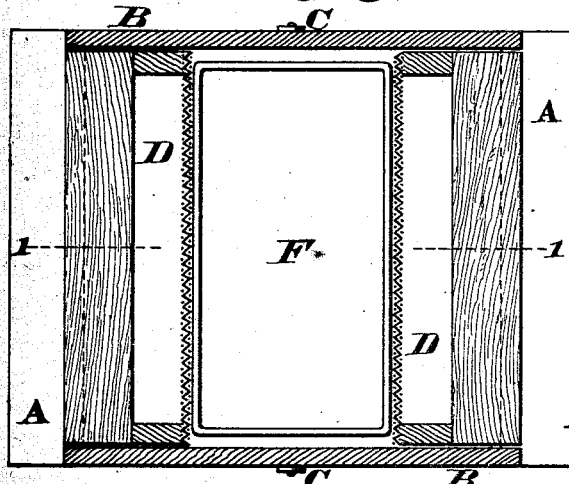
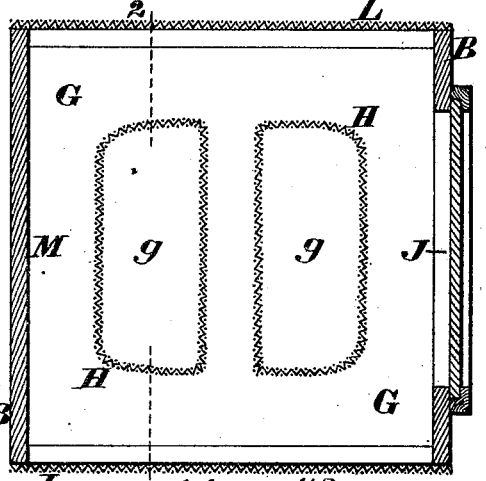

UNITED STATES PATENT OFFICE.

CHARLES ARANDALL AND WILLIAM C. RUNYAN, OF MARATHON, OHIO.

IMPROVEMENT IN FLY-TRAPS.

Specification forming part of Letters Patent No. 163,719, dated May 25, 1875; application filed April 13, 1874.

*To all whom it may concern:*

Be it known that we, CHARLES ARANDALL and WILLIAM C. RUNYAN, both of Marathon, Clermont county, Ohio, have invented a new and useful Fly-Trap, of which the following is a specification:

Our invention relates to an arrangement of roomy entrances which communicate with a bait-chamber by means of upturned wire-gauze conductors, and of wire-gauze cones leading upward from raised chamber into a lighted "*cul-de-sac*," from which the bodies of the flies can be emptied from time to time through a door provided for that purpose.

Figures 1 and 2 are vertical sections through a trap embodying our invention, said sections being taken, respectively, at the lines 1 1 and 2 2. Figs. 3 and 4 are horizontal sections through the trap at the lines 3 3 and 4 4.

A is a rectangular board constituting the base or floor, and to which the body B is secured by hooks C or other fastenings. D are entrance-ways the full width of the trap, and terminating inwardly in upturned spouts E, whose open extremities communicate with the lower part of the interior of our trap, called by us the bait-chamber I. Between the passages E, and on the floor A, is placed our bait-trap F. G is an upper floor having two large apertures, *g*, from which rise two wire-gauze caps, H, having orifices *h* in top which communicate with a large upper chamber or *cul-de-sac*, K, whose top and two sides consist of wire-gauze L, and whose remaining sides M are of wood. In one of these wooden sides is a door, J. This upper chamber, being large and mostly of wire-gauze, admits a flood of light.

The operation is as follows: The flies, allured by the smell of bait, enter readily the wide passages, and on emerging from the conductors have to descend to reach the comparatively dark floor of the bait-chamber. When there the only conspicuous light is directly above, and the flies accordingly pass upward, through the caps, into the *cul-de-sac*, where they accumulate in great numbers, and may be killed by a momentary exposure to heat, and emptied through the doorway J. This door may be omitted, and the trap emptied of its contents by lifting the screen L from one or both sides of the box B M, or said screen may, for this purpose, be entirely removed.

It will be seen that this device is so arranged that the flies are attracted by the bait into the trap through the up curved gauze-spout, and having arrived at the end of the passage in the bait-chamber, the flies are led away from the bait by the light above.

We claim as our invention—

1. The lower or bait chamber I, having broad entrances D D leading to the upwardly-projecting curved gauze-spouts E E, and the bait-tray F, in combination with the upper or light chamber K, the platform G, having apertures *g*, and the conductors H, having orifices *h*, as and for the purpose set forth.

2. A fly-trap, having longitudinal-ascending entrances, formed of wire-gauze, projecting at an angle into the cage, the lower sheet of gauze being stretched upon beveled blocks forming part of the base of the trap, as and for the purpose set forth.

In testimony of which invention we hereunto set our hands.

CHAS. ARANDALL.
WILLIAM C. RUNYAN.

Witnesses:
GEO. H. KNIGHT,
JAMES H. LAYMAN.